(12) United States Patent
Wan et al.

(10) Patent No.: US 10,161,556 B2
(45) Date of Patent: *Dec. 25, 2018

(54) HIGH TEMPERATURE INSULATED PIPELINES

(71) Applicant: SHAWCOR LTD., Toronto (CA)

(72) Inventors: Eileen Wan, Richmond Hill, CA (US); Adam Jackson, Trondheim (NO); Eirik Simonsen, Sandefjord (NO); Masahide Yodogawa, Chadds Ford, PA (US)

(73) Assignee: Shawcor, Ltd., Toronto, Ontario (CA)

( * ) Notice: Subject to any disclaimer, the term of this patent is extended or adjusted under 35 U.S.C. 154(b) by 116 days.

This patent is subject to a terminal disclaimer.

(21) Appl. No.: 14/870,602

(22) Filed: Sep. 30, 2015

(65) Prior Publication Data

US 2016/0018049 A1    Jan. 21, 2016

Related U.S. Application Data

(63) Continuation of application No. 14/454,818, filed on Aug. 8, 2014.

(Continued)

(51) Int. Cl.
*F16L 59/14* (2006.01)
*F16L 1/16* (2006.01)
(Continued)

(52) U.S. Cl.
CPC ............ *F16L 59/029* (2013.01); *B23K 31/02* (2013.01); *B23K 31/027* (2013.01); *B23K 37/00* (2013.01);
(Continued)

(58) Field of Classification Search
CPC ......... B32B 25/08; B32B 27/08; B32B 27/40; B32B 2274/00; B32B 2307/304;
(Continued)

(56) References Cited

U.S. PATENT DOCUMENTS 3,422,855 A    1/1969 Weyer
3,508,946 A    4/1970 Plueddemann et al.
(Continued)

FOREIGN PATENT DOCUMENTS

CA    2 835 008 A1    11/2012
GB    2165910 A    4/1986
(Continued)

OTHER PUBLICATIONS

Chemnetbase, "PTFE General Properties," http://poly.chemnetbase.com, p. 1-6, accessed Dec. 21, 2015.*
(Continued)

*Primary Examiner* — Gerard Higgins
*Assistant Examiner* — Kevin C Ortman, Jr.

(57) ABSTRACT

An insulated high-temperature transport conduit for use in undersea environments. The conduit comprises a continuous steel pipe having at least a first layer of thermal insulation provided over its outer surface. The first layer of thermal insulation comprises a polymer composition having a thermal conductivity of less than about 0.40 W/mK and long-term heat resistance at continuous operating temperatures within the range from about 150° C. to above about 205° C. The first thermal insulation layer comprises a polymer composition comprising a polymer selected from the group consisting of one or more fluoropolymers, hydrogenated nitrile butadiene rubber (HNBR), and a blend of one or more fluoropolymers with HNBR. The conduit may further comprise second and third layers of insulation on top of the first layer, along with a corrosion protection coating underlying the first thermal insulation layer.

31 Claims, 5 Drawing Sheets

Related U.S. Application Data (60) Provisional application No. 61/863,976, filed on Aug. 9, 2013, provisional application No. 62/021,751, filed on Jul. 8, 2014.

(51) Int. Cl.

| | | |
|---|---|---|
| *F16L 59/02* | (2006.01) | |
| *B23K 31/02* | (2006.01) | |
| *B23K 37/00* | (2006.01) | |
| *F16L 58/10* | (2006.01) | |
| *F16L 58/18* | (2006.01) | |
| *F16L 59/20* | (2006.01) | |
| *F16L 13/02* | (2006.01) | |
| *B29C 39/10* | (2006.01) | |
| *B29C 33/00* | (2006.01) | |
| *F16L 9/02* | (2006.01) | |
| *F16L 9/22* | (2006.01) | |

(52) U.S. Cl.
CPC .......... *B29C 33/0011* (2013.01); *B29C 39/10* (2013.01); *F16L 1/161* (2013.01); *F16L 9/02* (2013.01); *F16L 9/22* (2013.01); *F16L 13/0272* (2013.01); *F16L 58/1054* (2013.01); *F16L 58/1081* (2013.01); *F16L 58/181* (2013.01); *F16L 59/14* (2013.01); *F16L 59/143* (2013.01); *F16L 59/20* (2013.01)

(58) Field of Classification Search
CPC .......... B32B 2307/714; B32B 2597/00; E21B 17/01; E21B 36/003; F16L 58/1072; F16L 59/143
USPC ........ 138/149; 428/316.6, 319.1, 319.3, 335, 428/35.7, 36.5, 36.92, 389, 411.1, 412, 428/419, 422, 423.1, 424.2, 425.5, 450, 428/457, 500, 519, 521, 522, 524, 66.4, 428/704; 525/165, 178
See application file for complete search history.

(56) References Cited

U.S. PATENT DOCUMENTS

| | | | |
|---|---|---|---|
| 3,685,546 A | 8/1972 | Sigmund | |
| 3,992,237 A | 11/1976 | Gerholt et al. | |
| 4,019,761 A | 4/1977 | Heidemann | |
| 4,148,982 A | 4/1979 | Morozumi et al. | |
| 4,341,842 A | 7/1982 | Lampe | |
| 4,415,184 A | 11/1983 | Stephenson et al. | |
| 4,530,970 A | 7/1985 | Morozumi et al. | |
| 4,660,861 A | 4/1987 | Argy et al. | |
| 4,746,147 A | 5/1988 | Walker | |
| 4,748,208 A | 5/1988 | Kasahara et al. | |
| 5,143,122 A | 9/1992 | Adkins | |
| 5,571,585 A | 11/1996 | Yoshida et al. | |
| 5,721,285 A * | 2/1998 | Nakamoto | C08J 9/0066 521/126 |
| 6,068,026 A | 5/2000 | Garois | |
| 6,264,871 B1 | 7/2001 | Mullen et al. | |
| 6,576,311 B2 | 6/2003 | Noguchi et al. | |
| 7,493,918 B2 | 2/2009 | Thomson | |
| 7,588,058 B2 * | 9/2009 | McKeen | B05D 5/083 138/137 |
| 8,127,800 B2 | 3/2012 | Ramaswamy et al. | |
| 8,176,943 B2 | 5/2012 | Stroempl et al. | |
| 8,397,765 B2 | 3/2013 | Jackson et al. | |
| 2005/0165168 A1 * | 7/2005 | Park | C08J 3/005 525/165 |
| 2007/0259147 A1 | 11/2007 | Boudry et al. | |
| 2009/0159146 A1 | 6/2009 | Jackson et al. | |
| 2010/0043906 A1 * | 2/2010 | Jackson | B32B 15/08 138/149 |
| 2010/0112260 A1 * | 5/2010 | Patel | C08J 9/32 428/36.91 |
| 2011/0165407 A1 | 7/2011 | Weidinger et al. | |
| 2011/0297316 A1 | 12/2011 | Jackson et al. | |
| 2012/0077935 A1 * | 3/2012 | Gurevich | C08L 27/18 525/200 |
| 2012/0202047 A1 | 8/2012 | Welch et al. | |
| 2012/0227851 A1 | 9/2012 | Stroempl et al. | |
| 2013/0098798 A1 | 4/2013 | Hatton et al. | |
| 2013/0108800 A1 | 5/2013 | Chakraborty et al. | |
| 2013/0171367 A1 | 7/2013 | Kusinski et al. | |
| 2014/0311614 A1 | 10/2014 | Edmondson et al. | |
| 2015/0041017 A1 | 2/2015 | Hegdal et al. | |
| 2015/0041018 A1 | 2/2015 | Wan et al. | |

FOREIGN PATENT DOCUMENTS

| | | | |
|---|---|---|---|
| WO | WO 8911618 | 11/1989 | |
| WO | WO 2009/027686 A1 | 3/2009 | |
| WO | WO 2009086068 A2 * | 7/2009 | ........ C08K 5/0025 |
| WO | WO 2013/070074 A1 | 5/2013 | |
| WO | WO 2013/154432 A1 | 10/2013 | |
| WO | WO 2014/028444 a2 | 2/2014 | |
| WO | WO 2015/017938 A1 | 2/2015 | |

OTHER PUBLICATIONS

International Search Report and Written Opinion for PCT/CA2014/050750.
U.S. Appl. No. 61/863,976, filed Aug. 8, 2013.
U.S. Appl. No. 14/954,545, filed Nov. 30, 2015.

* cited by examiner

HIGH TEMPERATURE INSULATED PIPELINES

CROSS-REFERENCE TO RELATED APPLICATIONS

The present application is a continuation of U.S. application Ser. No. 14/454,818, filed Aug. 8, 2014, which claims priority to and the benefit of U.S. Provisional Patent Application No. 61/863,976 filed Aug. 9, 2013; and U.S. Provisional Patent Application No. 62/021,751 filed Jul. 8, 2014.

FIELD OF THE INVENTION

The present invention relates to insulated fluid and/or gas transport conduits, and methods for the production and application thereof. More particularly, the insulated transport conduits comprise undersea pipelines for carrying single or multi-phase fluids such as oil, gas and water, particularly such pipelines operating at temperatures from about 150° C. to above about 205° C.

BACKGROUND OF THE INVENTION

There is increasing demand in the oil and gas industry for higher performance thermal coatings to insulate and protect off-shore transport conduits operating at temperatures from about 150° C. to above about 205° C. In order to maintain the conduit at the required operating temperatures in an undersea environment, the coatings must have high thermal stability to resist the high operating temperatures, and low thermal conductivity to prevent the formation of hydrates and waxes that would compromise pumping efficiency of the fluid in the conduit. The thermal conductivity can be further decreased through foaming the coating to some required degree.

Multi-phase fluid flow is common in subsea fluid transport conduits, such as flowlines and risers. Two main concerns in such systems are the formation of gas-water hydrates and the deposition of wax. Both of these phenomena are related to the temperature of the fluid, and in extreme cases the conduit can become severely constricted or even blocked. This in turn can lead to reduced or lost production. In particularly serious cases this may lead to the need to replace sections of pipeline or entire systems with corresponding loss of asset value. Thermal insulation is used to provide controlled energy loss from the system either in steady state condition or in the case of planned and unplanned stoppage and thereby provide a reliable basis for operation.

For single-pipe flowlines and risers, using bonded external insulation, the mechanical loads as well as the requirements placed on the mechanical and thermal performance of thermal insulation systems normally increase with water depth. Hence, the traditional thermal insulation foam technology used in shallow waters and the associated design and test methodologies may not be applicable to deep-water projects, where the depths may exceed about 1,000 meters. In cases of long pipe tiebacks, for example subsea-to-beach tiebacks, and in cases where the service temperature is above approximately 150° C., there exist limitations with current technology that may hinder the successful development of offshore, deep water oil or gas fields.

Current technologies include single pipe solutions, typically with insulation requirements in the heat transfer coefficient range of 3-5 W/m$^2$ K, using polypropylene foam or polyurethane foam as the insulant, and so-called pipe-in-pipe systems wherein a second pipe surrounds the primary conduit, the annulus between the two pipes being filled with an insulating material.

Limitations and deficiencies of these technologies include:

Relatively high thermal conductivity of known insulating systems, necessitating excessively thick coatings to achieve the required insulation performance, leading to potential difficulties in foam processing, potential issues with residual stress, difficulties during pipe deployment, and sea-bed instability.

Insufficient resistance to temperatures from about 150° C. to above about 205° C., resulting in compression and creep resistance issues in high temperature installations at high water depths and material degradation resulting in a loss of mechanical properties.

Excessive costs due to poor material cost versus performance capabilities or high transportation and deployment costs.

Deployment and operation disadvantages with Pipe-In-Pipe systems due to weight factors leading to buckling and weld failure if not properly addressed, and the need for high gripping loads during pipe laying.

Although the high temperature resistant pipe insulation systems disclosed in U.S. Pat. No. 8,397,765 by Jackson et al. (incorporated herein by reference in its entirety) provide improved thermal performance over known insulation systems at operating temperatures of about 130° C. or higher, these thermoplastic-based insulation systems generally have insufficient resistance to temperatures from about 150° C. to above about 205° C.

Therefore, there remains a need for improved insulated fluid and/or gas transport conduits undersea pipelines for carrying single or multi-phase fluids such as oil, gas and water, particularly those operating at temperatures from about 150° C. to above about 205° C.

SUMMARY OF THE INVENTION

In one aspect, there is provided an insulated high-temperature transport conduit for use in undersea environments. In an embodiment, the conduit comprising: (a) a continuous steel pipe made up of one or more pipe sections, wherein the steel pipe has an outer surface and an inner surface; and (b) a first layer of thermal insulation provided over the outer surface of the steel pipe, wherein the first layer of thermal insulation is comprised of a polymer composition having a thermal conductivity of less than about 0.40 W/mK and long-term heat resistance at continuous operating temperatures within the range from about 150° C. to above about 205° C. The first thermal insulation layer comprises a polymer composition comprising a polymer selected from the group consisting of one or more fluoropolymers, hydrogenated nitrile butadiene rubber (HNBR), and a blend of one or more fluoropolymers with HNBR.

In an embodiment, the first thermal insulation layer is a solid or a foam, such as a syntactic foam.

In another embodiment, the first thermal insulation layer has a thermal conductivity of about 0.15 to about 0.30 W/mK.

In yet another embodiment, the fluoropolymer comprises a crosslinked, thermoset fluoroelastomer composition.

In yet another embodiment, the crosslinked, thermoset fluoroelastomer composition comprises a propylene-tetrafluoroethylene copolymer.

In yet another embodiment, the polymer is crosslinked by a chemical crosslinking agent or by high energy ionizing radiation or by a chemical crosslinking agent.

In yet another embodiment, the polymer composition further comprises said chemical crosslinking agent.

In yet another embodiment, said chemical crosslinking agent is a peroxy compound selected from the group comprising monoperoxides, peroxy esters, diperoxides, and combinations thereof.

In yet another embodiment, the polymer composition further comprises a crosslinking auxiliary agent selected from the group comprising allyl compounds, sulfur, organic amines, maleimides, methacrylates, and divinyl compounds.

In yet another embodiment, the crosslinked, thermoset fluoroelastomer composition of the first thermal insulation layer is bonded to an adjacent layer by an adhesive which bonds to the fluoroelastomer during vulcanization.

In yet another embodiment, the adhesive is a liquid adhesive formulated for vulcanization and bonding of elastomers to steel substrates, and comprises a mixture of polymers, organic compounds and mineral fillers dissolved or dispersed in an organic solvent system.

In yet another embodiment, interlayer adhesion between the crosslinked, thermoset fluoroelastomer composition of the first thermal insulation layer and an adjacent layer is provided by a surface activation pretreatment of the first thermal insulation layer with plasma or corona discharge.

In yet another embodiment, the insulated high-temperature transport conduit further comprises a corrosion protection coating directly applied to the outer surface of the steel pipe and bonded thereto, and underlying the first thermal insulation layer.

In yet another embodiment, the corrosion protection coating is comprised of one or more members of the group comprising an epoxy phenolic, a polyphenylene sulphide, a fluoropolymer, or a polyimide, including modified versions and blends thereof.

In yet another embodiment, the insulated transport conduit further comprises an outer protective topcoat applied over the first thermal insulation layer and forming an outer surface of the insulated transport conduit, wherein the outer protective topcoat is comprised of a solid polymeric material.

In yet another embodiment, the insulated transport conduit further comprises a second thermal insulation layer on top of the first thermal insulation layer, wherein the second thermal insulation layer is comprised of a thermoplastic in the form of a solid, a blown foam or a syntactic foam.

In yet another embodiment, the second thermal insulation layer comprises a polymeric material selected from one or more members of the group comprising: solid or foamed polypropylene homopolymer or copolymer, polybutylene, polyethylene; polystyrene, high impact polystyrene, modified polystyrene, and crosslinked or partially crosslinked polypropylene and polyethylenes, including copolymers, blends and elastomers thereof; and wherein the first thermal insulation layer underlies the second thermal insulation layer.

In yet another embodiment, the second thermal insulation layer comprises a polymeric material selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethyl-pentene and blends thereof; cyclic olefin copolymers and blends thereof; and, partially crosslinked thermoplastic elastomers.

In yet another embodiment, the second thermal insulation layer comprises an epoxy-modified polymer network.

In yet another embodiment, the epoxy-modified polymer network comprises an epoxy-urethane hybrid system or an epoxy-olefin hybrid system having a temperature rating from about 90° C. to about 140° C.

In yet another embodiment, the second thermal insulation layer comprises an elastomer selected from the group consisting of HNBR, nitrile butadiene rubber (NBR), silicone rubber, ethylene propylene diene monomer (EPDM) rubber, and butyl rubber.

In yet another embodiment, the second thermal insulation layer comprises HNBR.

In yet another embodiment, the crosslinked, thermoset fluoroelastomer composition comprises a fluoroelastomer selected from Type 1 to Type 5 FKMs, FFKMs, and FVMQs.

In yet another embodiment, the fluoropolymer comprises a fluorocarbon thermoplastic selected from the group consisting of perfluoroalkoxy (PFA) copolymer of polytetrafluoroethylene and perfluoro alkyl vinyl ether; polytetrafluoroethylene (PTFE); fluorinated ethylene propylene (FEP); a copolymer of tetrafluoroethylene and hexafluoroethylene; and polyvinylidene fluoride (PVDF). For example, the fluoropolymer may comprises a propylene-tetrafluorethylene copolymer having a mole ratio of tetrafluoroethylene:propylene of from 99:1 to 10:90, for example about 55:45.

In yet another embodiment, the propylene-tetrafluorethylene copolymer further comprises one or more copolymerized components selected from the group consisting of ethylene, isobutylene, acrylic acid, alkyl esters of acrylic acid, methacrylic acid, alkyl esters of methacrylic acid, vinyl fluoride, vinylidene fluoride, hexafluoropropylene, chloroethylvinyl ether, chlorotrifluoroethylene, perfluoroalkylvinyl ether.

In yet another embodiment, the fluoroelastomer in the crosslinked, thermoset fluoroelastomer composition has a number average molecular weight from about 100,000 to about 250,000.

In yet another embodiment, the insulated transport conduit further comprises a layer of adhesive between the first and second thermal insulation layers.

In yet another embodiment, the insulated transport conduit further comprises a third thermal insulation layer on top of the second thermal insulation layer, and having a composition which is the same as, or different from, the compositions of the first and second thermal insulation layers.

In yet another embodiment, the third thermal insulation layer comprises an epoxy-modified polymer network selected from the group consisting of an epoxy-urethane hybrid system and an epoxy-olefin hybrid system.

In yet another embodiment, the second thermal insulation layer comprises an elastomer selected from the group consisting of HNBR and NBR.

In yet another embodiment, the insulated transport conduit further comprises a corrosion protection coating directly applied to the outer surface of the steel pipe and bonded thereto, and underlying the first thermal insulation layer; wherein the corrosion protection coating is comprised of an epoxy phenolic; and wherein the one or more fluoropolymers of the first insulation layer comprises a crosslinked, thermoset fluoroelastomer composition.

In yet another embodiment, the insulated transport conduit further comprises an adhesive layer between the corrosion protection coating and the first thermal insulation layer.

BRIEF DESCRIPTION OF THE DRAWINGS

The invention will now be described, by way of example only, with reference to the accompanying drawings in which.

DETAILED DESCRIPTION

The embodiments described below relate to insulating and protective coatings and thermally insulated fluid and/or gas transport conduits incorporating said coatings for use in subsea environments. The embodiments also relate to methods of manufacturing said insulating and protective coatings and for manufacturing thermally insulated high-temperature fluid and/or gas transport conduits incorporating said coatings.

The term "high temperature" as used herein refers to operating temperatures or service temperatures which are from about 150° C. to above about 205° C.

The term "solid" as used herein with reference to one or more of the layers of an insulated transport conduit means that the layers are unfoamed, i.e. solid layers as defined herein have a degree of foaming of 0%, and do not incorporate microspheres as would be present in syntactic foams. Unfoamed layers may be filled or unfilled, wherein optional fillers include organic and inorganic fibres and powders.

The term "foam" as used herein includes both blown foams and syntactic foams, as defined in the following description.

The fluid and/or gas transport conduits described below are oil and gas pipelines which are typically made up of one or more steel pipe sections. The term "fluid and/or gas transport conduits", and similar terms as used herein, are intended to include such oil and gas pipelines and related components, including flowlines, risers, jumpers, spools, manifolds, bends, flanges, valves, fittings and ancillary equipment.

A major consideration in the use of steel pipe is protection of the pipe from long-term corrosion in humid and high-temperature service conditions. Therefore the insulating and protective coatings described herein may comprise one or more corrosion-protection layers or a multi-layer corrosion protection system which is applied over the blasted and cleaned steel pipe prior to the application of any subsequent layers, including the thermal insulation layers described herein.

It will be appreciated that layers making up the insulating and protective coatings described below are not shown to scale in the drawings. In particular, the thicknesses of some of the layers making up the coatings are exaggerated in relation to the thicknesses of the other layers and also relative to the thickness and diameter of the steel pipe.

Figure 1:
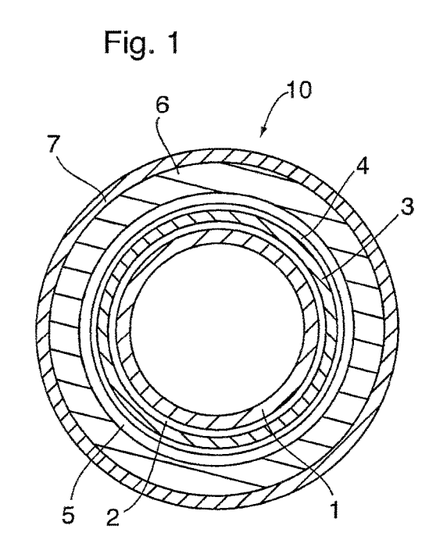
FIG. 1 is a transverse cross-section of an insulated pipeline according to a first embodiment of the invention.

FIG. 1 illustrates a transverse cross-section of an insulated oil and gas pipeline 10 according to a first embodiment. The insulated pipeline 10 includes one or more sections of steel pipe 1 in which the insulating and protective coating includes a three-layer corrosion protection system. According to this system, the steel pipe 1 is coated with a corrosion protection layer 2 comprised of a high temperature corrosion protection material as described below, an intermediate first adhesive layer 3 applied over the corrosion protection layer 2, and a first protective topcoat 4 applied over the first adhesive layer 3. The first protective topcoat 4 provides added corrosion and mechanical protection and the adhesive layer 3 provides an adhesive bond between the topcoat 4 and the underlying corrosion protection layer 2. The topcoat 4 is shown in FIG. 1 as a relatively thin layer between the adhesive layer 3 and the overlying insulation layers described below. The composition and thickness of the topcoat 4 will at least partially depend on the compositions of the underlying adhesive layer 3 and the overlying insulation layers, particularly with respect to adhesion to those layers. The topcoat 4 may also comprise the first insulation layer, and may comprise an extrudable thermoplastic or elastomeric resin.

Figure 2:
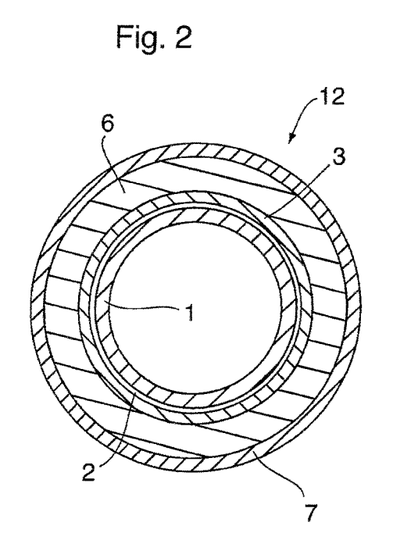
FIG. 2 is a transverse cross-section of an insulated pipeline according to a second embodiment of the invention.
Figure 4:
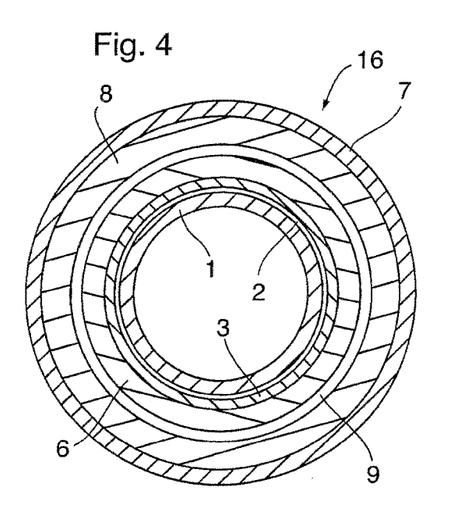
FIG. 4 is a transverse cross-section of an insulated pipeline according to a fourth embodiment of the invention.

FIG. 2 illustrates a transverse cross-section of an insulated oil and gas pipeline 12 according to a second embodiment. The insulated pipeline 12 includes one or more sections of steel pipe 1 provided with a two-layer corrosion protection system, wherein the steel pipe 1 is provided with a corrosion protection layer 2 comprised of a high temperature corrosion protection material and a first adhesive layer 3 applied over layer 2, as in FIG. 1. In the corrosion protection system shown in FIG. 2 the first adhesive layer 3 doubles as both adhesive and topcoat, thereby eliminating the need for the separate application of a first protective topcoat 4. A similar two-layer corrosion protection system is shown in FIG. 4 which illustrates a transverse cross-section of an insulated oil and gas pipeline 16 according to a fourth embodiment.

Figure 3:
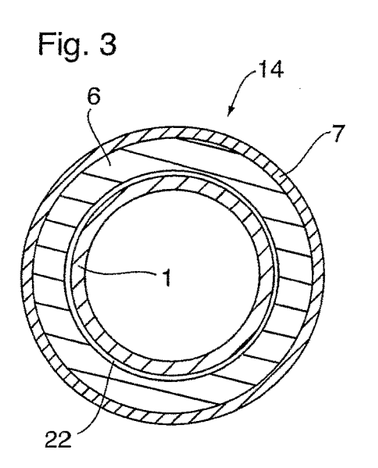
FIG. 3 is a transverse cross-section of an insulated pipeline according to a third embodiment of the invention.

As an alternative to the multi-layer corrosion protection systems illustrated in FIGS. 1, 2 and 4, the steel pipe 1 may instead be provided with a single-layer composite corrosion protection layer wherein the high temperature corrosion protection material described below, adhesive and polymer topcoat components are pre-mixed and applied onto the pipe 1 as a variably graded coating. FIG. 3 illustrates a transverse cross-section of an insulated oil and gas pipeline 14 according to a third embodiment of the invention. The insulated pipeline 14 includes one or more sections of steel pipe 1 provided with such a single-layer composite corrosion protection coating 22.

In the insulated oil and gas pipelines according to the embodiments disclosed herein also comprise one or more thermal insulation layers. The pipelines 10, 12 and 14 illustrated in FIGS. 1 to 3 include only a first thermal insulation layer 6, whereas the pipeline 16 of FIG. 4 is provided with a first (inner) insulation layer 6 and a second (outer) thermal insulation layer 8. It will also be appreciated that insulated oil and gas pipelines may comprise more than two layers of thermal insulation.

Where the insulated pipeline includes a single corrosion protection layer or a multi-layer corrosion protection system, the first thermal insulation layer 6 must firmly adhere to said corrosion protection layer or system. This is a particularly important consideration if the first thermal insulation layer 6 and the underlying corrosion protection layer, or system, are comprised of dissimilar polymeric materials. Adhesion between the layers, also known as interlayer adhesion, is also dependent upon the coating temperature and the mode of application of the layers. For example, it may be necessary to pre-heat the corrosion protection layer or system prior to the application of the first thermal insulation layer 6 to better fuse the two layers together and maximize interlayer adhesion. It may also be necessary to apply an adhesive layer between the corrosion protection layer, or system, and the first thermal insulation layer 6. This is illustrated, for example, in FIG. 1, in which a second adhesive layer 5 is applied between the first thermal insulation layer 6 and the underlying protective topcoat 4 of the three-layer corrosion protection system, and serves to bond the first thermal insulation layer 6 to the topcoat 4. In the embodiments of FIGS. 2 and 4, the first adhesive layer 3 serves as both an adhesive and a protective topcoat and bonds the first thermal insulation layer 6 to the corrosion protection layer 2. In the embodiment of FIG. 3, the thermal insulation layer 6 is directly bonded to the corrosion protective layer 2 without the aid of an adhesive layer.

Interlayer adhesion may also be accomplished through the activation of one or more of the surfaces to be adhered using plasma or corona discharge treatment. This may also be utilized in conjunction with a separate adhesive layer.

As shown in FIGS. 1 to 5, an outer protective topcoat 7 may be applied over the outer layer of insulation to provide further resistance to static pressure at great depths. The outer protective topcoat 7 may comprise the same polymeric material as one or more of the thermal insulation layers, or a modified or reinforced version thereof, and is typically in a solid, unfoamed state.

It will be appreciated that the outer protective topcoat 7 and the thermal insulation layers 6, 8 may instead be comprised of different polymeric materials, in which case it may be preferred to provide an additional layer of adhesive (not shown) between the outer layer of thermal insulation 6 or 8 and the outer protective topcoat 7. It will also be appreciated that the protective topcoat 7 is not necessary in all embodiments, and FIGS. 6 to 9 illustrate insulated pipelines 18, 20, 24 and 26 which are identical to pipelines 10, 12, 14 and 16, respectively, with the exception that they do not include a protective topcoat 7. The outer protective topcoat may be unnecessary, for example, where the outermost thermal insulation layer 6 or 8 is a solid, or is foamed but naturally forms a solid skin.

As shown in FIG. 4, the insulating and protective coating may comprise two or more thermal insulation layers of the same or different composition, density, etc. This allows the system to be tailored for precise thermal insulation performance related to the system requirements of the installed application.

Figure 5:
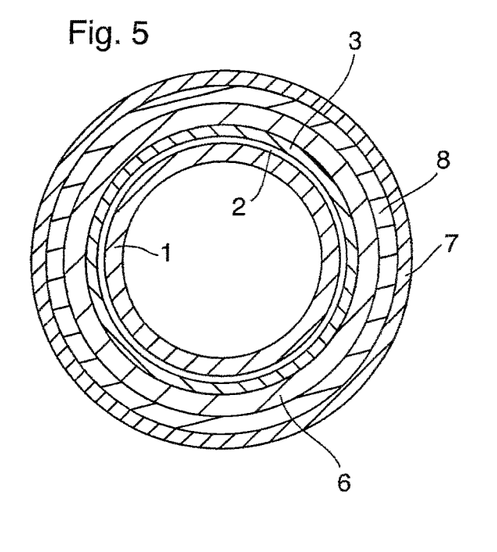
FIG. 5 is a transverse cross-section of an insulated pipeline according to a fifth embodiment of the invention.
Figure 6:
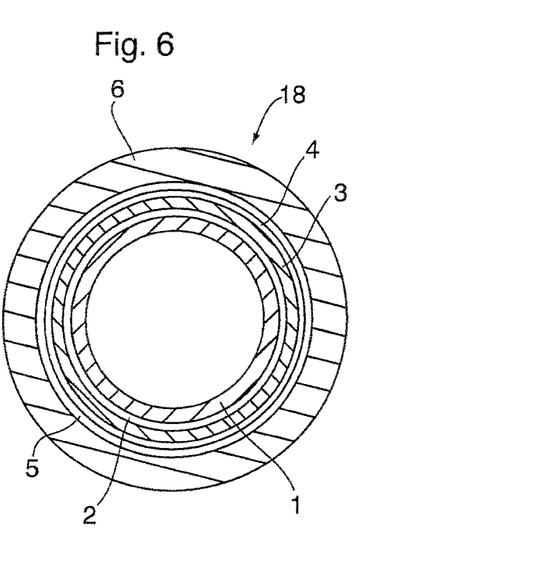
FIG. 6 is a transverse cross-section of an insulated pipeline according to a sixth embodiment of the invention.
Figure 7:
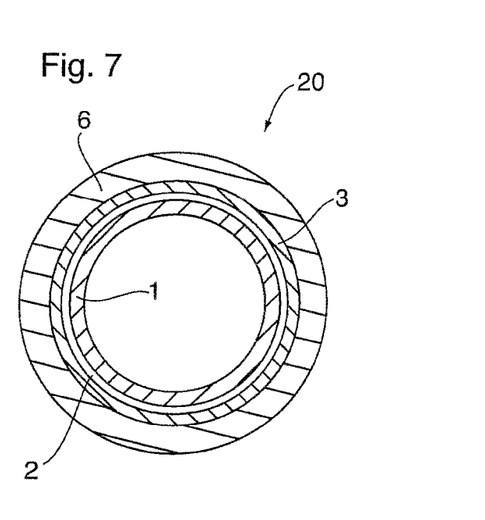
FIG. 7 is a transverse cross-section of an insulated pipeline according to a seventh embodiment of the invention.
Figure 8:
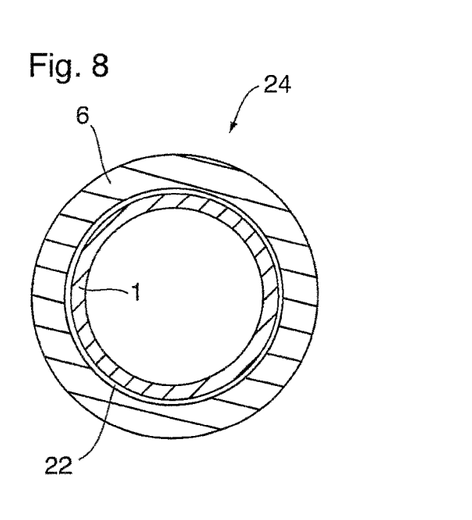
FIG. 8 is a transverse cross-section of an insulated pipeline according to a eighth embodiment of the invention.
Figure 9:
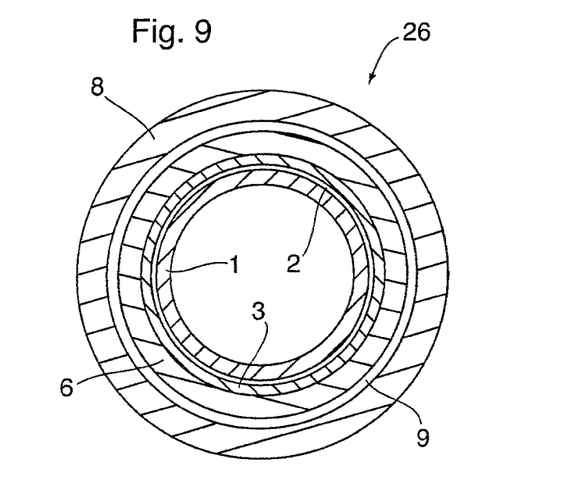
FIG. 9 is a transverse cross-section of an insulated pipeline according to a ninth embodiment of the invention.

The embodiment illustrated in FIG. 4 includes a first thermal insulation layer 6 and a second thermal insulation layer 8 which may be of the same or different composition and/or density. The first and second thermal insulation layers 6 and 8 are separated by a layer 9 of unfoamed polymeric material which may be of the same or different composition as either one or both of the layers 6 and 8 and may function as an adhesive between layers 6 and 8. It will be appreciated that an adhesive layer may be provided between the layers 6 and 8, or between one or more of layers 6, 8 and the adjacent unfoamed layer 9, or between any additional thermal insulation layers, particularly if said layers are of dissimilar composition. It will also be appreciated that the unfoamed layer 9 may not be necessary in all situations, for example where there is no second thermal insulation layer 8, where the individual thermal insulation layers 6, 8 can be bonded directly to one another, or where plasma or corona treatment is used to effect adhesion. For example, FIG. 5 shows an insulated pipeline 17 identical to the pipeline 16 of FIG. 4 except for the omission of unfoamed layer 9 between layers 6 and 8.

Although the embodiments shown in the drawings include either one or two thermal insulation layers, it will be appreciated that insulated pipelines according to the invention may include more than two layers of thermal insulation, with or without layers of unfoamed polymer and/or adhesive being provided between the thermal insulation layers.

It is also necessary to provide thermal insulation around the joint area where two lengths of steel pipe are welded together. The composition of this pipe joint insulation system must be bondable to both the corrosion protection layer, or system, applied directly over the welded pipe joint and the existing thermal insulation layer, or layers, including any protective topcoats and any other layers of the insulated pipe exposed as a result of cutting back the insulation from the pipe ends to allow welding thereof.

Figure 10:
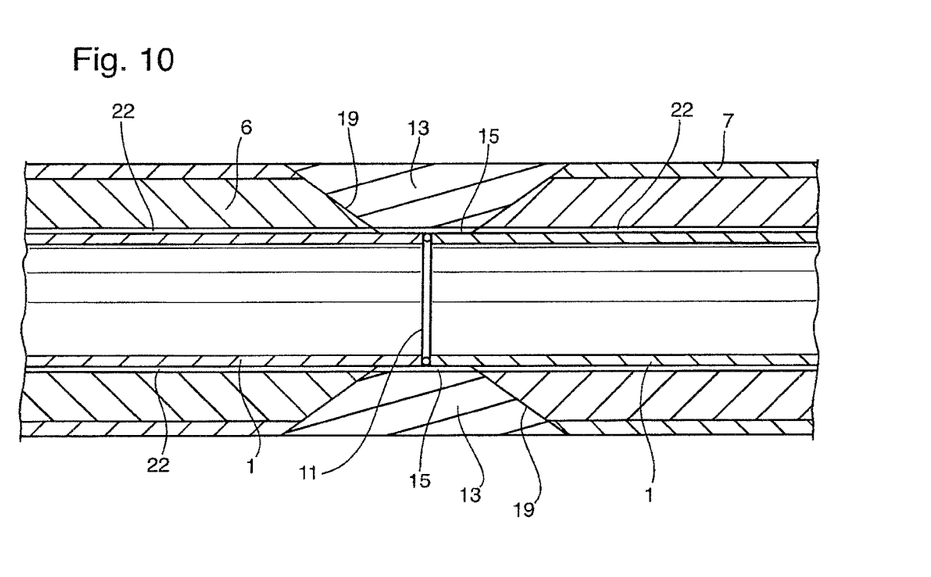
FIG. 10 is a longitudinal cross-section of the pipe joint area of two insulated pipelines welded together.

FIG. 10 illustrates a longitudinal cross-section of a circular pipe joint weld area 11 at which two steel pipes 1 are joined, for example to form a portion of a pipeline. In the manufacture of coated/insulated pipe, the ends of the pipe 1 must be left bare so as to prevent damage to the coating when the pipes 1 are joined in the field by welding. Typically, the main line coating is cut back from the end of the pipe 1 to form chamfers which are spaced from the ends of the pipe 1. The chamfering step is typically performed in the factory as part of the manufacturing process.

The steel pipes 1 shown in FIG. 10 each have a main line coating (also referred to as a "line pipe coating") as shown in FIG. 3 comprising a corrosion protection layer 22, a first thermal insulation layer 6 and an outer protective topcoat 7. As mentioned above, the main line coating is cut back at a distance from the ends of pipes 1, to form chamfered ends 19. Although FIG. 10 shows the pipes 1 having a specific main line coating, it will be appreciated that the pipes 1 could be provided with any of the insulating and protective coatings shown in the drawings or described herein.

The individual pipe sections 1 are joined together in the field to form a continuous pipeline. The joints between the pipe sections are known as "field joints", and are formed by butt welding the pipe sections 1 together, and then applying a field joint insulation layer 13 over the weld area 11, i.e. the area of bare pipe surrounding the weld joint. These steps may be performed as the pipeline is being reeled onto or from a lay vessel (so called "tie-in joints"), during prefabrication of multi-jointed pipe strings, or immediately before laying of the pipeline.

After welding, the bare metal in the weld area 11 is provided with a field joint corrosion protection layer 15 which may have the same composition and thickness as any of the corrosion protection layers or systems described above, and which may have the same or different composition as the factory-applied corrosion protection layer 22 of the main line coating. A field joint insulation layer 13 is then applied over the corrosion protection layer 15 and over the chamfered ends 19, to substantially completely fill the weld area 11 to a thickness which is substantially the same as that of the mainline coating. The field joint insulation layer 13 applied to the weld area may have the same or different composition as the first thermal insulation layer 6 and/or topcoat 7 of the main line coating.

To provide an effective field joint, the field joint insulation layer 13 is bonded to the field joint corrosion protection layer 15, and to the chamfered ends 19 of the mainline coating. In order to achieve sufficient bonding with the field joint insulation layer 13, an adhesive may be used and/or the chamfered ends 19 of the main line coating may be surface-activated so as to improve bonding with the fluoropolymer insulation layer 13. The surface activation may comprise a plasma or corona discharge pretreatment of the chamfered ends 19 of the main line coating immediately before application of the thermal insulation layer 13, and optionally before application of the field joint corrosion protection layer 15. The pretreatment creates reactive or polar chemical groups to which the fluoropolymer molecules of the field joint insulation layer 13 can form a strong bond. It may also be desired to heat the joint area 11 prior to application of the field joint insulation layer 13.

As for the method of application, the field joint insulation layer 13 may be applied to the joint area 11 by injection molding, for example by applying an annular mold over the joint area 11 and filling the mold cavity with the field joint insulation layer 13 in the form of a molten resin. In an alternative methodology, the field joint insulation may also be applied via wrapping of extruded or pre-prepared strips or the application of pre-formed shells.

Composition of Layers
Corrosion Protection Coating(s)

As mentioned above, it may be advantageous to apply one or more corrosion protection layers or a multi-layer corrosion protection system to the steel pipe prior to any subsequent layers. The corrosion protection layer may comprise epoxy phenolics, polyphenylene sulphides, fluoropolymers, or polyimides, including modified versions and blends thereof. In some cases, it has been found that an adhesive layer is not needed to bond these corrosion protection coatings to the pipe or to the topcoat or first insulation layer. Some of these materials can be used at higher service temperatures than conventional epoxy-based corrosion protection systems, for example as described in above-mentioned U.S. Pat. No. 8,397,765 by Jackson et al.

Some of the higher temperature-resistant corrosion protection coatings mentioned above may also have properties which make them suitable for use as thermal insulation layers in some of the embodiments disclosed herein. While the corrosion protection coating will typically be comprised of a different polymer grade having different properties, it is conceivable that the same type and grade of polymer may be used for both corrosion protection and thermal insulation. In this case, a single layer of this polymer may serve as both corrosion protection coating and thermal insulation layer.

An adhesive layer may not be necessary where it is possible to achieve bonding of adjacent layers using plasma or corona treatment.

Additional Adhesive Layer(s)

In cases where it is necessary to apply an adhesive layer between adjacent thermal insulation layers or between a thermal insulation layer and one or more of the other layers, including any solid protective layers and topcoats, particularly layers of dissimilar composition, the adhesive material used should ideally bond equally well to said layers. The adhesives used are typically polymers or reactive systems with functionalities having mutual affinity to the layers requiring bonding, the functionalities being specific to the chemical composition of the layers requiring bonding. Preferably the bond strength should be high enough to promote cohesive failure between the individual layers.

The adhesive layer may also comprise a coextruded structure of two or more layers, the outer layers of which will bond to the respective insulation layers or topcoats with which they are compatible.

The adhesive layer between adjacent thermal insulation layers and between a thermal insulation layer and one or more of the other layers may, for example, comprise a grafted polymer or copolymer, or polymer blend with one or more moieties compatible with each of the individual layers to be bonded.

In embodiments where the first thermal insulation layer 6 comprises a fluoroelastomer, the first thermal insulation layer 6 may be bonded to an adjacent layer by an adhesive which bonds to the fluoroelastomer during vulcanization. Such an adhesive may be a liquid adhesive specially formulated for vulcanization/bonding of elastomers to steel and other rigid substrates. Such adhesives typically have proprietary compositions, and may comprise may comprise mixtures of polymers, organic compounds and mineral fillers dissolved or dispersed in an organic solvent system. These types of adhesives are manufactured by companies such as The Dow Chemical Company, Lord Corporation, and 3M Corporation.

The adhesive layer may be applied by powder spray application, liquid spray application, brush/roller coating, or side-wrap, crosshead extrusion or co-extrusion methods.

An additional adhesive layer may not be necessary where the two adjacent layers have a mutual affinity for each other, or where it is possible to achieve bonding of the layers using plasma or corona treatment.

First Thermal Insulation Layer (6)

The first thermal insulation 6 is designed to withstand operating temperatures in excess of the maximum operating temperatures from about 150° C. to above about 205° C., and generally in excess of temperatures which can be withstood by systems currently used for the thermal insulation of subsea pipelines, such as the systems described in above-mentioned U.S. Pat. No. 8,397,765 by Jackson et al.

The first thermal insulation layer is also designed to exhibit adequate compressive creep resistance and modulus at these temperatures, and hence maintain the required thermal insulation over the lifetime of the oil and gas recovery project. In addition, the compositions should be sufficiently ductile to withstand the bending strains experienced by the insulated pipe during reeling and installation operations.

The first thermal insulation layer 6 comprises a high temperature resistant polymer composition selected to provide the first thermal insulation layer 6 with one or more of the following properties:

thermal conductivity of less than about 0.40 W/mk; for example about 0.10 to 0.35 W/mK, typically from about 0.15 to 0.30 W/mK;

long-term heat resistance at continuous operating temperatures within the range from about 150° C. to above about 205° C.

Figure 11:
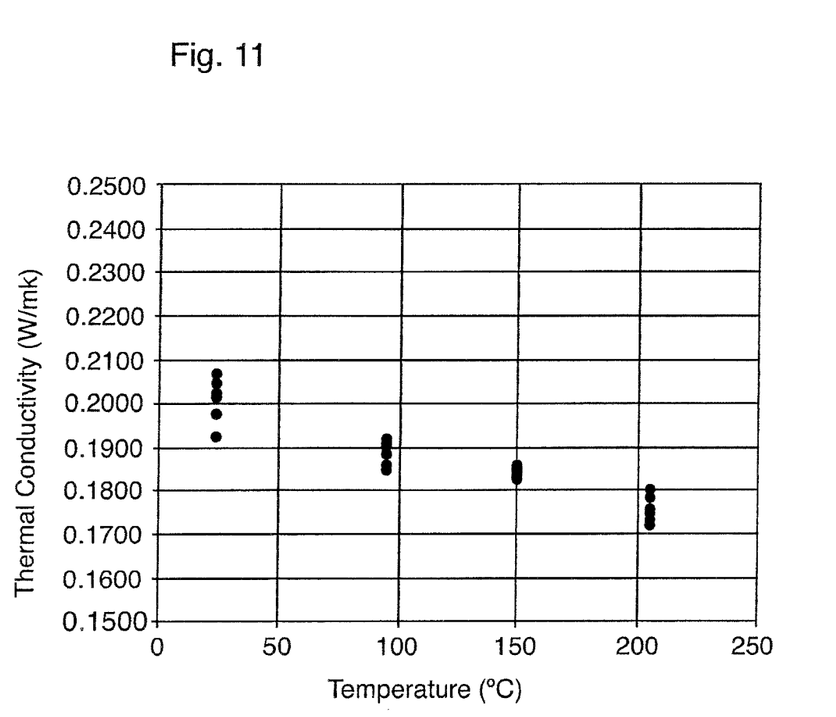
FIG. 11 is a graph of thermal conductivity versus temperature for a fluoroelastomer composition.
Figure 12:
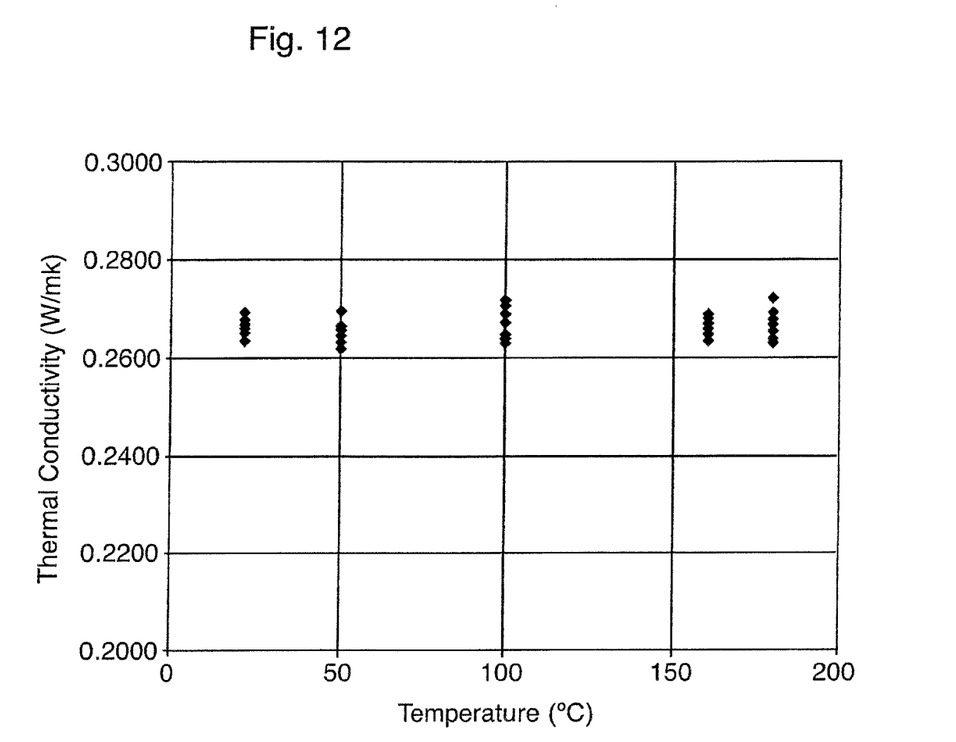
FIG. 12 is a graph of thermal conductivity versus temperature for a HNBR composition.

The first thermal insulation layer 6 is applied at a sufficient thickness to provide the insulated transport conduit with an acceptable heat transfer coefficient (U) for the conditions under which it is to be used, with U typically being in the range from about 1 to about 10 W/m²K, for example from about 2 to about 8 W/m²K. The thermal conductivity of the first thermal insulation layer is less than about 0.40 W/mK, for example from about 0.10-0.35 W/mK, typically from about 0.15-0.30 W/mK. For example, FIG. 11 shows the thermal conductivity of a TFE/P fluoroelastomer composition as described below over a temperature range from 23° C. to 205° C. FIG. 12 shows the thermal conductivity of a HNBR composition as described below over a temperature range from about 23° C. to 180° C., showing that the HNBR composition has a thermal conductivity between about 0.26 and 0.275 over this temperature range.

The thickness of the first thermal insulation layer 6 is highly variable, due to the fact that each pipeline system is designed for use under specific conditions of depth, temperature etc. The first thermal insulation layer 6 may have all the above properties.

The first thermal insulation layer 6 also possesses resistance to chemicals and harsh environments, strength, processibility etc.

The composition of the first thermal insulation layer 6 is variable, and depends on the operating temperatures under which the conduit will be used. For example, in some embodiments, where the first insulation layer 6 is required to possess long-term heat resistance at a maximum operating temperature of about 180° C., the layer 6 may be comprised of hydrogenated nitrile butadiene rubber (HNBR). In other embodiments, where the first insulation layer 6 is required to possess long-term heat resistance at a maximum operating temperature within the range from about 180° C. to above about 205° C., the layer 6 may be comprised of one or more fluoropolymers, or a blend of one or more fluoropolymers with HNBR. These HNBR/fluoropolymer blends have long-term heat resistance at temperatures greater than the maximum for HNBR and less than the maximum for fluoropolymers. Of course, any of these polymer compositions and/or blends will perform in the temperature range from about 150° C. to about 180° C.

For example, the first thermal insulation layer 6 may comprise fluoropolymer composition comprising one or more fluoropolymers selected from crosslinked (vulcanized) fluoroelastomers and fluorocarbon thermoplastics. The fluoropolymer composition of the first thermal insulation layer 6 may either be solid or foamed, including a syntactic foam.

Suitable fluoropolymer compositions may, for example, comprise copolymers of tetrafluoroethylene (TFE) and propylene, also known as TFE/P or FEPM copolymers, which are fluoroelastomers predominantly comprised of tetrafluoroethylene units (—CF$_2$—CF$_2$—) and propylene units (—CH$_2$—CH(CH$_3$)—).

Alternate fluoroelastomers which may be used in the first thermal insulation layer include those known as Type 1 to Type 5 FKMs, including:

Type 1 FKMs comprising copolymers of vinylidene fluoride (VDF) and hexafluoropropylene (HFP), such as those known as Viton™, Dyneon™, Dai-EI™, Tecnoflon™ and Fluorel™;

Type 2 FKMs comprising terpolymers of VDF, HFP and tetrafluoroethylene (TFE);

Type 3 FKMs comprising copolymers of VDF, HFP, TFE and perfluoromethylevinyl ether (PMVE);

Type 4 FKMs comprising terpolymers of VDF, TFE and propylene; and

Type 5 FKMs comprising copolymers of VDF, HFP, TFE, PMVE, ethylene FFKM perfluoroelastomers (such as Kalrez™, Tecnoflon PFR™, and Perlast™), and fluorosilicone rubbers (FVMQ).

Instead of comprising an elastomer, the fluoropolymer may comprise a fluorocarbon thermoplastic such as perfluoroalkoxy (PFA) copolymer of polytetrafluoroethylene and perfluoro alkyl vinyl ether; polytetrafluoroethylene (PTFE); fluorinated ethylene propylene (FEP); a copolymer of tetrafluoroethylene and hexafluoroethylene; and/or polyvinylidene fluoride (PVDF).

Where the fluoropolymer is a fluoroelastomer comprising propylene-tetrafluorethylene copolymer, the fluoroelastomer composition may have a mole ratio of tetrafluoroethylene: propylene of from 99:1 to 10:90; for example 95:5 to 30:70; or 90:10 to 45:55. For example, the mole ratio of tetrafluoroethylene:propylene may be about 55:45.

Where the fluoroelastomer comprises a propylene-tetrafluorethylene copolymer, the fluoroelastomer composition may further include one or more additional copolymerized components selected from the group comprising ethylene, isobutylene, acrylic acid, alkyl esters of acrylic acid, methacrylic acid, alkyl esters of methacrylic acid, vinyl fluoride, vinylidene fluoride, hexafluoropropylene, chlorotrifluorovinyl ether, chlorotrifluoroethylene, perfluoroalkylvinyl ether.

The molar ratio of tetrafluoroethylene and propylene in the propylene-tetrafluoroethylene copolymer, as well as the identity and amount of the additional copolymerized component(s) are selected to provide desired characteristics of heat resistance and chemical resistance, for example.

The number average molecular weight of fluoroelastomer in the fluoroelastomer composition, such as a propylene-tetrafluoroethylene copolymer, is usually more than about 30,000; for example about 50,000 to about 400,000; or about 100,000 to about 250,000.

The fluoroelastomer of the fluoroelastomer composition is crosslinked by addition of a suitable chemical crosslinking agent or by high energy ionizing radiation. Where the fluoroelastomer is chemically crosslinked, the fluoroelastomer composition will include a chemical crosslinking agent such as a peroxy compound. Suitable peroxy compounds are selected from the group comprising monoperoxides, peroxy esters and diperoxides. One or more peroxy compounds can be used.

Suitable monoperoxides are selected from the group comprising diacyl peroxides such as dibenzoyl peroxide. Suitable peroxy esters are selected from the group comprising dicumyl peroxide, di-t-butyl peroxide, t-butyl peroxyacetate, t-butyl peroxyisopropyl carbonate, t-butyl peroxybenzoate. Suitable diperoxides are selected from the group comprising 1,3-bis-(t-butylperoxy isopropyl)benzene; 2,5-dimethyl-2,5-di-(t-butylperoxy)-hexine-3,2,5-dimethyl-2,5-di-(t-butylperoxyl)-hexane; alpha,alpha'-bis-(t-butylperoxy)-p-diisopropyl benzene; and 2,5-dimethyl-2,5-di-(benzoylperoxy)-hexane.

The amount of chemical crosslinking agent contained in the fluoroelastomer composition is typically about 0.1 to 20 parts by weight, or about 1 to 10 parts by weight, per 100 parts by weight of the fluoroelastomer.

Where the fluoroelastomer is chemically crosslinked, the fluoroelastomer composition may further include a crosslinking auxiliary agent selected from the group comprising allyl compounds, sulfur, organic amines, maleimides, methacrylates, and divinyl compounds. Allyl compounds are selected from the group comprising diallyl phthalate, triallyl phosphate, triallyl cyanurate, triallyl isocyanurate and diallyl melamine. One or more allyl compounds can be used.

The amount of crosslinking auxiliary agent contained in the fluoroelastomer composition is typically about 0.1 to 20 parts by weight, or about 0.2 to 10 parts by weight, per 100 parts by weight of the fluoroelastomer.

The fluoroelastomer composition may further comprise one or more additives selected from the group comprising fillers, pigments, antioxidants, stabilizers etc. Examples of additives include metal oxides such as magnesium oxide; reinforcing agents such as carbon black and fine silica; and other additives such as sodium stearate and/or zinc stearate. For example, carbon black may be present in the fluoroelastomer composition in an amount of about 30 parts by weight, per 100 parts by weight of the propylene-tetrafluorethylene copolymer.

The fluoroelastomer composition has a specific gravity from about 1.10 to about 1.70, typically about 1.55 to about 1.60. The fluorine content of the fluoroelastomer composition is about 55-60 percent by weight.

Once crosslinked, the fluoroelastomer composition is a thermoset material, and does not melt when heated. The decomposition temperature of the crosslinked propylene-tetrafluorethylene copolymer is about 415° C.

For example, where the fluoroelastomer is a propylene-tetrafluorethylene copolymer, the copolymer is chemically crosslinked by heating the fluoroelastomer composition for a sufficient time and at a sufficient temperature to cause crosslinks to form between the molecules of the propylene-tetrafluorethylene copolymer. The temperature of crosslinking is typically in a range from about 80 to 250° C., for example from about 120 to 200° C., and the time of crosslinking is dependent on the thickness of the insulation layer and the composition thereof. A second heat treatment or post cure may also be performed to improve physical characteristics of the crosslinked fluoroelastomer composition. For example, the second heat treatment may be performed at a temperature in the range from about 150 to 250° C., for example from about 180 to 230° C. for a sufficient time to achieve maximal tensile strength.

A suitable fluoroelastomer composition for use in the first thermal insulation layer 6 is commercially available from AGC Chemicals (Asahi Glass Col, Ltd.) under the trademark AFLAS™. For example, suitable fluoroelastomer compositions include AFLAS™ 100, AFLAS™ 150, and AFLAS™ 300, based on copolymers having the repeating structure —(CF$_2$CF$_2$)—(CH$_2$CH(CH$_3$))$_m$—; and AFLAS™ 200, based on copolymers having the repeating structure —(CF$_2$CF$_2$)—(CH$_2$CH(CH$_3$))$_m$—(CF$_2$CF$_2$)$_n$—. AFLAS™ copolymer compositions provide the first thermal insulation layer 6 with high heat resistance and high chemical resistance.

As mentioned above, in the fluoroelastomer composition, the propylene-tetrafluorethylene copolymer may be replaced by a vinylidene fluoride-hexafluoropropylene copolymer, VDF/HFP/TFE terpolymer, VDF/HFP/TFE/PMVE, VDF/TFE/propylene, VDF/HFP/TFE/PMVE/ethylene, FFKM, FVMQ.

It will be appreciated that the insulated pipelines according to the invention may comprise one or more additional thermal insulation layers comprised of said fluoroelastomer composition, in addition to the first thermal insulation layer 6.

Second Thermal Insulation Layer (8)

In some embodiments, a second thermal insulation layer 8 is provided over the first thermal insulation layer 6. Because the outer surface of the first thermal insulation layer 6 is at a lower temperature than the operating temperature of the conduit, the second thermal insulation layer 8 may not necessarily require the same level of high temperature resistance. Therefore, the composition of the second thermal insulation layer 8 is highly variable.

Typically the second thermal insulation layer 8 will comprise a thermoplastic, such as conventional polyethylene, polypropylene, polybutylene, polyurethane and copolymers, blends and elastomers thereof. Alternatively, the second thermal insulation layer 8 may be selected from any of the foamed or solid polystyrene or styrene-based thermoplastics disclosed in above-mentioned US Patent Application Publication No. US 2009/0159146 A1 by Jackson et al., which is incorporated herein by reference in its entirety. The styrenic insulations disclosed in this document are able to withstand operating temperatures from about 90 to about 120° C., for example up to about 100° C.

In an alternate embodiment, the second thermal insulation layer 8 may comprise an elastomeric material different from that of the first thermal insulation layer 6. Such elastomers include HNBR, nitrile butadiene rubber (NBR), silicone rubber, ethylene propylene diene monomer (EPDM) rubber, and butyl rubber.

The second thermal insulation layer 8 may instead comprise any of the high temperature resistant thermoplastics, either solid or foamed, disclosed in above-mentioned U.S. Pat. No. 8,397,765 by Jackson et al. The high temperature resistant thermoplastics disclosed therein are able to withstand operating temperatures of about 130° C. or higher. The high temperature resistant thermoplastic is selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

In another embodiment, the second thermal insulation layer R comprises an epoxy-modified polymer network, such as an epoxy-urethane hybrid system or an epoxy-olefin hybrid system. Such systems are sometimes referred to as network epoxy modified urethanes or network epoxy modified olefins. These epoxy-modified polymer networks typically have a temperature rating from about 90° C. to about 140° C.

The second thermal insulation layer 8 may be foamed or solid. Where the second thermal insulation layer 8 is foamed, it may either be a blown foam or a syntactic foam having a degree of foaming of up to about 50%, for example from about 5% to about 30%.

As mentioned above, one or more of the thermal insulation layers may also be provided with an additional protective layer, or topcoat, such as layers 7 and 9 described above, comprised of unfoamed polymeric material. The topcoats 7 and/or 9 may be prepared from the same material as one of the underlying thermal insulation layers 6 and/or 8, or a modified or reinforced version thereof.

It may be required, for example, to impart a higher degree of physical or chemical performance, such as impact, abrasion, crush or moisture resistance, to the outer surface of the insulated pipe, in which case it may be advantageous to prepare the outer protective topcoat 7 from a polymeric material having superior impact, abrasion, crush or chemical resistance to that from which the thermal insulation layer, or layers, is made. Such a material may comprise the thermal insulation material blended with suitable polymeric modifiers, compatibilisers, or reinforcing fillers or fibres, or it may comprise a dissimilar, preferably compatible, polymeric material. In the latter case, it may be necessary to apply an additional adhesive layer between the final thermal insulation layer and topcoat to effect adequate bonding of the two layers.

Also, as mentioned above, the thermal insulation layers 6, 8 may comprise dissimilar materials. For example, the second thermal insulation layer 8 and any thermal insulation layers exterior thereto may be foamed to progressively higher degrees the further they are away from the pipe wall.

Any of the thermal insulation layer may contain additives selected from one or more members of the group comprising inorganic fillers, reinforcing fillers or fibres, nano-fillers, conductive fillers, flame-retardant fillers, antioxidants, heat-stabilisers, process aids, compatibilisers, organic fillers, and pigments.

It will be appreciated that the insulated conduits as described herein may include more than two layers of thermal insulation. For example, the insulated conduits may include a third thermal insulation layer applied over the second thermal insulation layer, wherein the third thermal insulation layer may have a composition which is the same as, or different from, the first and second thermal insulation layers 6, 8 described above. For example, in a specific embodiment, the insulated conduit is provided with a line pipe coating comprising:

1. a corrosion protection layer 2 applied directly to the outer surface of the steel pipe 1, the layer 2 comprising an epoxy phenolic;
2. an adhesive layer 3 applied over the corrosion protection layer 2;
a first pipe insulation layer 6 comprising a fluoroelastomer composition, applied over the adhesive layer;
4. a second pipe insulation layer 8A comprising an elastomeric material different from that of the first pipe insulation layer 6, such as a HNBR and/or NBR;
5. a third pipe insulation layer 8B comprising an epoxy-modified polymer network as described above, for example network epoxy modified urethane.

Foaming Agents

As mentioned above, the first thermal insulation layer 6 is solid or foamed. In addition, any thermal insulation layers exterior to the first thermal insulation layer 6, including the second thermal insulation layer 8, may be foamed. Foamed thermal insulation layers can be prepared from high temperature resistant thermoplastics, by incorporating chemical foaming agents, by the physical injection of gas or volatile liquid, or by blending with hollow polymer, glass or ceramic microspheres. Foams generated through the action of chemical or physical foaming agents are generally referred to as "blown" foams. Foams containing hollow microspheres are referred to as "syntactic" foams.

Syntactic foams provide greater compressive creep and crush resistance than blown foams, but are generally less efficient thermal insulators and are considerably more expensive. A cost and performance optimized design may, for example, comprise one or more layers of syntactic foam surrounded by one or more layers of blown foam insulation.

Chemical foaming agents may function via either an endothermic (heat absorbing) or exothermic (heat generating) reaction mechanism. They are selected from one or more members of the group comprising sodium bicarbonate, citric acid, tartaric acid, azodicarbonamide, 4,4-oxybis(benzene sulphonyl) hydrazide, 5-phenyl tetrazole, dinitrosopentamethylene tetramine, p-toluene sulphonyl semicarbazide, or blends thereof. The chemical foaming agent may be an endothermic foaming agent, such as sodium bicarbonate blended with citric or tartaric acid.

Chemical foaming occurs when the foaming agent generates a gas, usually $CO_2$ or $N_2$, through decomposition when heated to a specific decomposition temperature. The initial decomposition temperature along with gas volume, release rate and solubility are important parameters when choosing a chemical foaming agent and they need to be carefully matched to the melt processing temperature of the particular thermoplastic being foamed.

For physical foaming, the gas or volatile liquid used is selected from the group comprising $CO_2$, supercritical $CO_2$, $N_2$, air, helium, argon, aliphatic hydrocarbons, such as butanes, pentanes, hexanes and heptanes, chlorinated hydrocarbons, such as dichloromethane and trichloroethylene, and hydrochlorofluorocarbons, such as dichlorotrifluoroethane. In the case of volatile liquids, foaming occurs when the heated liquid vaporizes into gas. Preferably the physical foaming agent is supercritical $CO_2$.

The hollow microspheres are selected from one or more members of the group comprising glass, polymeric, or ceramic, including silica and alumina, microspheres. Preferably the hollow microspheres are lime-borosilicate glass microspheres.

Thermal Insulation Application Process

The first and second thermal insulation layers 6, 8, and any protective topcoat layers 7, 9, may be applied to the steel pipe or a pipeline, preferably over the corrosion protection coating, or coatings, by rubber mandrel wrapping, sidewrap or crosshead extrusion, or co-extrusion, processes. Alternatively, these layers may in some cases be applied as a fusion bonded powder by spraying the pipe with powder-spray guns, passing the pipe through a "curtain" of falling powder, or using a fluidized bed containing the powder, or, b) as a liquid coating using liquid-spray guns. Melt fusion of the powder results from contact with the hot pipe.

Extrusion may be accomplished using single screw extrusion, either in single or tandem configuration, or by twin-screw extrusion methods. In the case of single screw extrusion, the extruder screw may be either single stage or 2-stage design.

A single stage compression screw would be adequate for chemical foam extrusion whereby the foaming agent is added as a pelleted concentrate or masterbatch which is pre-mixed with the polymer to be foamed using a multi-component blender, for example, mounted over the main feed port of the extruder. The design of the screw is important and it may incorporate barrier flights and mixing elements to ensure effective melting, mixing, and conveying of the polymer and foaming agent.

With a 2-stage screw, the first and second stages are separated by a decompression zone, at which point a gas or liquid physical foaming agent can be introduced into the polymer melt via an injection or feed port in the extruder barrel. The first stage acts to melt and homogenize the polymer, whereas the second stage acts to disperse the foaming agent, cool the melt temperature, and increase the melt pressure prior to the melt exiting the die. This may also be accomplished by tandem extrusion, wherein the two stages are effectively individual single screw extruders, the first feeding into the second. A 2-stage screw is also preferred for the extrusion of polymers which have a tendency to release volatiles when melted, or are hygroscopic, the extruder barrel then being equipped with a vent port positioned over the decompression zone through which the volatiles or moisture can be safely extracted.

Twin screw extrusion is preferred where the polymer to be foamed is shear sensitive or if it is required that fillers or other additives be incorporated into the insulation composition. It is particularly recommended for the extrusion of syntactic foams or blown foams prepared by the physical injection of a gas or liquid foaming agent. Since the twin screw design is typically modular, comprising several separate and interchangeable screw elements, such as mixing and conveying elements, it offers great versatility with respect to tailoring the screw profile for optimum mixing and melt processing.

In the case of syntactic foams, for example, the hollow microspheres are fed directly into the polymer melt using a secondary twin-screw feeder downstream of the main polymer feed hopper. An additional consideration with syntactic foams is potential breakage of the hollow microspheres during extrusion of the foam. Shear and compressive forces inside the extruder need to be minimized during processing of the foam to prevent this through judicious design of the extruder screw(s), barrels, manifolds and dies.

A static mixing attachment or gear pump may be inserted between the end of the screw and the die to further homogenize the melt, generate melt pressure, and minimize melt flow fluctuations.

For chemically or physically blown foams, the degree of foaming is dependent upon the required balance of thermal conductivity and compressive strength. Too high a degree of foaming, whilst beneficial for thermal insulation performance, may be detrimental to the compressive strength and creep resistance of the foam. Any foamed thermal insulation layers are typically foamed from about 5% to about 50%, or 5% to 30%, or 10% to 25%. The degree of foaming is defined herein as the degree of rarefaction, i.e. the decrease in density, and is defined as $[(D_{matrix}-D_{foam})/D_{matrix}]\times 100$. Expressed in this way, the degree of foaming reflects the volume percentage of gas under the assumption that the molecular weight of gas is negligible compared to that of the matrix, which is generally true. Alternatively, the degree of foaming can be measured visually by microscopic determination of cell density.

With respect to the particular foam insulations described herein, it is important that conditions of mixing, temperature and pressure are adjusted to provide a uniform foam structure comprising very small or microcellular bubbles with a narrow size distribution evenly distributed within the polymer matrix, in order to ensure maximum compressive strength, thermal performance and compressive creep resistance of the insulation when subjected to high external pressures and temperatures. Also, when extruding blown foam insulation it is important that foaming be prevented until the polymer exits the extrusion die.

Actual coating of the pipe may be accomplished using an annular crosshead die attached to the thermal insulation extruder through which the pre-heated pipe, with a prior-applied corrosion protection layer or multi-layer corrosion protection system, is conveyed, the thermal insulation thereby covering the entire surface of the pipe by virtue of the annular die forming said thermal insulation into a tubular profile around the conveyed pipe.

Alternatively, the thermal insulation may be applied by a side-wrap technique whereby the thermal insulation is extruded through a flat strip or sheet die. The thermal insulation is extruded in the form of a sheet or tape which is then wrapped around the pipe. It may be necessary to apply a number of wraps to achieve the required thermal insulation thickness and, hence, performance. The individually wrapped layers of a fluoroelastomer embodiment are fused together by virtue of the non-crosslinked state of the elastomer with temperature and pressure while the layers of a thermoplastic embodiment are fused together by virtue of the molten state of the material being extruded. It may also be necessary to preheat the outer surface of the previous layer to ensure proper adhesion of any subsequent layer.

The application of thermal insulation by the side-wrap technique may involve wrapping the pipe as it is simultaneously rotated and conveyed forwardly along its longitudinal axis, as described above. It may also involve the application of a pre-extruded tape using rotating heads while the pipe is conveyed longitudinally but not rotated. In this particular case, the winding angle of the thermal insulation layers can be adjusted by varying the speed of pipe movement in the longitudinal direction and/or by varying the rotational speed of the pipe or the rotating heads. The tape may be wound in successive layers at opposite winding angles to maintain neutrality of the pipe, until the required thickness has been built up. Application of a tension tape after application of an elastomer may be utilized to provide pressure for fusing layers together during curing.

If it is necessary to apply an adhesive layer between the corrosion protection layer, or system, and the thermal insulation layer, or between individual thermal insulation layers, this can be accomplished using either a single layer sheet or annular die, or a co-extrusion die whereby a multi-layer adhesive or the adhesive and thermal insulation layers are applied simultaneously. The outer protective topcoat, if necessary, may be similarly applied. Alternatively, as mentioned above, where the adhesive is a liquid it may be applied by liquid spray application.

Pipe Joint Insulation System

The pipe joint insulation system referred to in FIG. 10 comprises a high temperature resistant fluoropolymer insulation layer 13, identical or similar in composition to the thermal insulation layer, or layers, described above, and which is bondable to the corrosion protection layer or system 15, the existing thermal insulation layer, or layers 6, and the topcoat 7. Adhesive may be used to bond the fluoropolymer insulation layer 13 to existing thermal insulation layers 8 and/or to the underlying corrosion protection layer 15.

The pipe joint insulation system also comprises a corrosion protection layer 15, which may have a single or multi-layer structure. Preferably, the corrosion protection layer is similar or identical to the corrosion protection layers and systems described above in connection with FIGS. 1 to 4.

Although the invention has been described with reference to certain specific embodiments, it is not limited thereto. Rather, the invention includes all embodiments which may fall within the scope of the following claims.

What is claimed is:

1. An insulated high-temperature transport conduit for use in undersea environments, the conduit comprising:
   (a) a continuous steel pipe made up of one or more pipe sections, wherein the steel pipe has an outer surface and an inner surface; and
   (b) a first thermal insulation layer provided over the outer surface of the steel pipe, wherein the first thermal insulation layer has a thermal conductivity of less than about 0.40 W/mK and long-term heat resistance at continuous operating temperatures within the range from about 150° C. to about 205° C.;
   wherein the first thermal insulation layer is solid and consists of a thermoset fluoroelastomer composition which does not melt when heated, wherein the thermoset fluoroelastomer composition comprises a crosslinked fluoroelastomer.

2. The insulated high-temperature transport conduit according to claim 1, wherein the first thermal insulation layer has a thermal conductivity of about 0.15 to about 0.30 W/mK.

3. The insulated high-temperature transport conduit according to claim 1, wherein the crosslinked fluoroelastomer of the thermoset fluoroelastomer composition comprises a crosslinked propylene-tetrafluoroethylene copolymer.

4. The insulated high-temperature transport conduit according to claim 1, wherein the crosslinked fluoroelastomer of the thermoset fluoroelastomer composition is crosslinked by a chemical crosslinking agent or by high energy ionizing radiation.

5. The insulated high-temperature transport conduit according to claim 4, wherein the chemical crosslinking agent is selected from the group consisting of monoperoxides, peroxy esters, diperoxides, and combinations thereof.

6. The insulated high-temperature transport conduit according to claim 5, wherein the crosslinked fluoroelastomer of the thermoset fluoroelastomer composition is crosslinked by the chemical crosslinking agent and a crosslinking auxiliary agent selected from the group consisting of allyl compounds, sulfur, organic amines, maleimides, methacrylates, and divinyl compounds.

7. The insulated high-temperature transport conduit according to claim 1, wherein the thermoset fluoroelastomer composition of the first thermal insulation layer is bonded to an adjacent layer by an adhesive which bonds to the fluoroelastomer during vulcanization.

8. The insulated high-temperature transport conduit according to claim 1, wherein interlayer adhesion between the thermoset fluoroelastomer composition of the first thermal insulation layer and an adjacent layer is provided by a surface activation pretreatment of the first thermal insulation layer with plasma or corona discharge.

9. The insulated high-temperature transport conduit according to claim 1, further comprising a corrosion protection coating directly applied to the outer surface of the steel pipe and bonded thereto, and underlying the first thermal insulation layer.

10. The insulated high-temperature transport conduit according to claim 1, further comprising a second thermal insulation layer on top of the first thermal insulation layer, wherein the second thermal insulation layer is comprised of a thermoplastic in the form of a solid, a blown foam or a syntactic foam.

11. The insulated high-temperature transport conduit according to claim 1, further comprising a second thermal insulation layer on top of the first thermal insulation layer, wherein the second thermal insulation layer comprises a polymeric material selected from one or more members of the group consisting of: solid or foamed polypropylene homopolymer or copolymer, polybutylene, polyethylene; polystyrene, high impact polystyrene, modified polystyrene, crosslinked or partially crosslinked polypropylene and polyethylenes, including copolymers, blends and elastomers thereof;
wherein the first thermal insulation layer underlies the second thermal insulation layer.

12. The insulated high-temperature transport conduit according to claim 1, further comprising a second thermal insulation layer on top of the first thermal insulation layer, wherein the second thermal insulation layer comprises an epoxy-modified polymer network comprising an epoxy-urethane hybrid system or an epoxy-olefin hybrid system having a temperature rating from about 90° C. to about 140° C.

13. The insulated high-temperature transport conduit according to claim 10, wherein the second thermal insulation layer comprises an elastomer selected from the group consisting of HNBR, nitrile butadiene rubber (NBR), silicone rubber, ethylene propylene diene monomer (EPDM) rubber, and butyl rubber.

14. The insulated high-temperature transport conduit according to claim 1, wherein the crosslinked fluoroelastomer of the thermoset fluoroelastomer composition is selected from Type 1 to Type 5 FKMs, FFKMs, and FVMQs.

15. The insulated high-temperature transport conduit according to claim 1, wherein the crosslinked fluoroelastomer of the thermoset fluoroelastomer composition is a propylene-tetrafluoroethylene copolymer having a mole ratio of tetrafluoroethylene:propylene of from 99:1 to 10:90.

16. The insulated high-temperature transport conduit according to claim 15, wherein the propylene-tetrafluoroethylene copolymer has a mole ratio of tetrafluoroethylene:propylene of about 55:45.

17. The insulated high-temperature transport conduit according to claim 15, wherein the propylene-tetrafluoroethylene copolymer further comprises one or more copolymerized components selected from the group consisting of ethylene, isobutylene, acrylic acid, alkyl esters of acrylic acid, methacrylic acid, alkyl esters of methacrylic acid, vinyl fluoride, vinylidene fluoride, hexafluoropropylene, chloroethylvinyl ether, chlorotrifluoroethylene, perfluoroalkylvinyl ether.

18. The insulated high-temperature transport conduit according to claim 1, wherein the crosslinked fluoroelastomer in the thermoset fluoroelastomer composition has a number average molecular weight from about 100,000 to about 250,000.

19. The insulated high-temperature transport conduit according to claim 10, further comprising a layer of adhesive between the first and second thermal insulation layers.

20. The insulated high-temperature transport conduit according to claim 10, further comprising a third thermal insulation layer on top of the second thermal insulation layer, and having a composition which is the same as, or different from, the compositions of the first and second thermal insulation layers.

21. The insulated high-temperature transport conduit according to claim 20, wherein the third thermal insulation layer comprises an epoxy-modified polymer network selected from the group consisting of an epoxy-urethane hybrid system and an epoxy-olefin hybrid system.

22. The insulated high-temperature transport conduit according to claim 21, wherein the second thermal insulation layer comprises an elastomer selected from the group consisting of HNBR and NBR.

23. The insulated high-temperature transport conduit according to claim 22, further comprising a corrosion protection coating directly applied to the outer surface of the steel pipe and bonded thereto, and underlying the first thermal insulation layer;
wherein the corrosion protection coating is comprised of an epoxy phenolic.

24. The insulated high-temperature transport conduit according to claim 22, further comprising an adhesive layer between the corrosion protection coating and the first thermal insulation layer.

25. The insulated high-temperature transport conduit according to claim 1, wherein the thermoset fluoroelastomer composition further comprises one or more additives selected from the group consisting of inorganic fillers, organic fillers, reinforcing fillers or fibers, nano-fillers, conductive fillers, flame-retardant fillers, antioxidants, heat stabilizers, process aids, compatibilizers and pigments.

26. The insulated high-temperature transport conduit according to claim 1, further comprising a second thermal insulation layer on top of the first thermal insulation layer, wherein the second thermal insulation layer comprises a polymeric material selected from one or more members of the group consisting of: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; partially crosslinked thermoplastic elastomers; and epoxy-modified polymer network;

wherein the first thermal insulation layer underlies the second thermal insulation layer.

27. An insulated high-temperature transport conduit for use in undersea environments, the conduit comprising:
 (a) a continuous steel pipe made up of one or more pipe sections, wherein the steel pipe has an outer surface and an inner surface; and
 (b) a first thermal insulation layer provided over the outer surface of the steel pipe, wherein the first thermal insulation layer is solid and consists of a thermoset fluoroelastomer composition which does not melt when heated, wherein the thermoset fluoroelastomer composition comprises a crosslinked propylene-tetrafluoroethylene copolymer;
 wherein the propylene-tetrafluoroethylene copolymer has a number average molecular weight from about 100,000 to about 250,000 prior to crosslinking;
 wherein the first thermal insulation layer has a thermal conductivity of about 0.15 to about 0.30 W/mK and a long-term heat resistance at continuous operating temperatures within the range from about 150° C. to about 205° C.

28. The insulated high-temperature transport conduit according to claim 27, wherein the propylene-tetrafluoroethylene copolymer is crosslinked with a crosslinking auxiliary agent selected from the group consisting of allyl compounds, sulfur, organic amines, maleimides, methacrylates, and divinyl compounds.

29. An insulated high-temperature transport conduit for use in undersea environments, the conduit comprising:
 (a) a continuous steel pipe made up of one or more pipe sections, wherein the steel pipe has an outer surface and an inner surface;
 (b) a corrosion protection coating directly applied to the outer surface of the steel pipe and bonded thereto, with the corrosion protection coating comprising an epoxy phenolic;
 (c) a first thermal insulation layer provided over the corrosion protection coating, wherein the first thermal insulation layer is solid, has a thermal conductivity of about 0.15 to about 0.30 W/mK, and has long-term heat resistance at continuous operating temperatures within the range from about 150° C. to about 205° C., wherein the first thermal insulation layer consists of a thermoset fluoroelastomer composition which does not melt when heated, wherein the thermoset fluoroelastomer composition comprises a crosslinked propylene-tetrafluoroethylene copolymer having a number average molecular weight from about 100,000 to about 250,000 prior to crosslinking; and
 (d) a second layer of thermal insulation provided over the first thermal insulation layer wherein the second thermal insulation comprises an epoxy-modified polymer network comprising an epoxy-urethane hybrid system or an epoxy-olefin hybrid system having a temperature rating from about 90° C. to about 140° C.

30. The insulated high-temperature transport conduit according to claim 27, wherein the thermoset fluoroelastomer composition further comprises one or more additives selected from the group consisting of inorganic fillers, organic fillers, reinforcing fillers or fibers, nano-fillers, conductive fillers, flame-retardant fillers, antioxidants, heat stabilizers, process aids, compatibilizers and pigments.

31. The insulated high-temperature transport conduit according to claim 29, wherein the thermoset fluoroelastomer composition further comprises one or more additives selected from the group consisting of inorganic fillers, organic fillers, reinforcing fillers or fibers, nano-fillers, conductive fillers, flame-retardant fillers, antioxidants, heat stabilizers, process aids, compatibilizers and pigments.

* * * * *